(12) United States Patent
Okada et al.

(10) Patent No.: US 11,512,744 B2
(45) Date of Patent: Nov. 29, 2022

(54) CLUTCH APPARATUS

(71) Applicant: NSK-WARNER K.K., Tokyo (JP)

(72) Inventors: Shinji Okada, Fukuroi (JP); Akira Iwano, Fukuroi (JP); Osamu Katayama, Fukuroi (JP); Yukiyoshi Suzuki, Fukuroi (JP); Ryo Kinoshita, Fukuroi (JP)

(73) Assignee: NSK-WARNER K.K., Tokyo (JP)

( * ) Notice: Subject to any disclaimer, the term of this patent is extended or adjusted under 35 U.S.C. 154(b) by 0 days.

(21) Appl. No.: 17/204,882

(22) Filed: Mar. 17, 2021

(65) Prior Publication Data

US 2021/0301882 A1 Sep. 30, 2021

(30) Foreign Application Priority Data

Mar. 26, 2020 (JP) .............................. JP2020-056149
Jan. 22, 2021 (JP) .............................. JP2021-008822

(51) Int. Cl.
| | |
|---|---|
| *F16D 7/04* | (2006.01) |
| *F16D 41/12* | (2006.01) |
| *F16D 7/10* | (2006.01) |
| *F16D 41/07* | (2006.01) |
| *F16D 41/066* | (2006.01) |
| *F16D 41/04* | (2006.01) |

(Continued)

(52) U.S. Cl.
CPC .............. *F16D 7/048* (2013.01); *F16D 7/021* (2013.01); *F16D 7/10* (2013.01); *F16D 41/04* (2013.01); *F16D 41/066* (2013.01); *F16D 41/07* (2013.01); *F16D 41/12* (2013.01); *F16D 41/14* (2013.01); *F16D 41/16* (2013.01); *F16D 47/02* (2013.01); *F16D 47/04* (2013.01)

(58) Field of Classification Search
CPC . F16D 7/02; F16D 7/021; F16D 41/07; F16D 41/12; F16D 41/14; F16D 47/02; F16D 47/04; F16D 7/00–7/10; F16D 41/064–41/16
See application file for complete search history.

(56) References Cited

U.S. PATENT DOCUMENTS 4,949,824 A * 8/1990 Buckley .................. F16D 7/021
                                                          188/196 D
7,766,140 B2 * 8/2010 Ponson ................. F16D 43/211
                                                          192/41 S (Continued)

FOREIGN PATENT DOCUMENTS

| JP | 2003-056605 A | 2/2003 |
| JP | 2019-127989 A | 8/2019 |

*Primary Examiner* — Richard M Lorence
(74) *Attorney, Agent, or Firm* — SGPatents PLLC

(57) ABSTRACT

An excessive torque releasing type clutch apparatus comprises an outer ring, an inner ring arranged radially inside and coaxially with the outer ring and rotatably relative to the outer ring, a torque transmitting portion capable of transmitting torque between the outer ring and the inner ring, and a restricting mechanism for restricting excessive torque from being input from an input torque transmitting member to a driving ring of the outer ring and the inner ring and restricting excessive inverse torque that is input to a driven ring of the outer ring and the inner ring from being input to the input torque transmitting member. Treatment steps for securing strength of constituent members of the clutch apparatus in manufacturing be simplified or omitted.

5 Claims, 7 Drawing Sheets

(51) Int. Cl.
  *F16D 7/02*    (2006.01)
  *F16D 41/14*   (2006.01)
  *F16D 41/16*   (2006.01)
  *F16D 47/04*   (2006.01)
  *F16D 47/02*   (2006.01)

(56) References Cited

U.S. PATENT DOCUMENTS

| | | | | |
|---|---|---|---|---|
| 8,042,669 B2 * | 10/2011 | Samie | ............... | F16D 41/12 |
| | | | | 192/43.1 |
| 2011/0147155 A1 * | 6/2011 | Heitzenrater | ....... | F16H 63/3026 |
| | | | | 192/55.1 |

* cited by examiner axial direction
the other ←——→ one

CLUTCH APPARATUS

The disclosures of the following priority applications are herein incorporated by references:
Japanese Patent Application No. 2020-056149, and
Japanese Patent Application No. 2021-008822.

TECHNICAL FIELD

The present invention relates to a clutch apparatus, and in particular an excessive torque releasing type clutch apparatus, that is used for the purpose of transmission of torque, backstop and the like in vehicles and industrial machines.

BACKGROUND ART

As a clutch apparatus that can change over torque transmitting direction, a ratchet type clutch apparatus has been known. In such a ratchet type clutch apparatus, a rotation in either direction of a relative rotation of an outer ring to an inner ring is locked transmitting torque. Such a locking of the relative rotation is conducted by pawl members received in either one of the outer ring or inner ring being engaged with splined portions formed in the other of the outer ring and the inner ring. There are concerns in such ratchet type clutch apparatus that quietness would be deteriorated due to impact noise upon engagement as well as durability of constituent members would be deteriorated due to impact torque.

With respect to such problems, Patent Literature 1 discloses an impact absorbing member that reduces impact noise. Patent Literature 2 discloses a configuration for softening impact torque stress to be adopted in portions of the outer ring or inner ring at which pawl members are received.

A sprag type clutch apparatus is known as another type clutch apparatus. The sprag type clutch apparatus comprises an annular outer race, an annular inner race and sprags disposed therebetween, wherein when the outer ring and the inner ring rotate relative to each other, the sprags are brought into engagement with the outer ring and the inner ring regarding one of directions of the relative rotation to lock them and transmit torque therebetween. In the sprag type clutch apparatus, generation of impact noise upon engagement is smaller compared with the ratchet type clutch apparatus. However, with respect to capacity of the clutch apparatus in itself, and capacity of the outer ring and the inner ring against impact torque like an inverse input torque, it is necessary to secure strength of parts in accordance with torque.

CITATION LIST

Patent Literature

Patent Literature 1: Japanese Patent Application Laid-Open No. 2003-056605
Patent Literature 2: Japanese Patent Application Laid-Open No. 2019-127989

SUMMARY OF INVENTION

Technical Problem

Even if techniques disclosed in the above Patent Literatures 1 and 2 are adopted in a ratchet type clutch apparatus, very special heat treatment such as carburizing treatment is required in order to secure necessary strength of constituent parts against impact torque, taking in consideration of unexpected excessive torque in abnormal mode. However, it is desirable to avoid or simplify such treatment in view of reducing manufacturing costs or the number of processing steps.

On the other hand, in case of a sprag type clutch apparatus also, if, for example, thickness in circumferential direction of the outer or inner ring is made large in order to secure strength of the outer or inner ring as countermeasure against impact torque, space and weight thereof would be increased. Moreover, special processing or treatment such as shot peening depending on strength requirement onto the outer and inner rings, will be required as in the case of the ratchet type clutch apparatus, and therefore it is desirable to simplify or eliminate such special processing or treatment in view of reducing manufacturing costs or the number of processing steps.

Taking the above described circumstances into consideration, an object of the present invention is to provide an excessive torque releasing type clutch apparatus, which can release excessive torque upon being input thereto, so that treating step for securing strength of constituent parts when manufacturing may be simplified or eliminated.

Solution to Problem

To solve the above object, according to the present invention, there is provided a clutch apparatus comprising:
an outer ring,
an inner ring disposed radially inside the outer ring and in coaxial with a center axis of the outer ring and rotatably relative to the outer ring,
a torque transmitting portion that is capable of transmitting torque having a center on the center axis between the outer ring and the inner ring, and
a restricting mechanism which restricts a transmission of input torque that exceeds a predetermined value from an input torque transmitting member to a driving ring of the outer ring and the inner ring, and a transmission of reverse input torque that is input to a driven ring of the outer ring and the inner ring and exceeds a predetermined torque, to the input torque transmitting member.

Advantageous Effect of the Invention

The present invention can provide an excessive torque releasing type clutch apparatus, which can release excessive torque upon being input thereto, and of which constituent parts can be manufactured with special heat treatment for securing strength being simplified or eliminated.

EMBODIMENTS FOR CARRYING OUT THE INVENTION

In the following, an excessive torque releasing type clutch apparatus according to a first embodiment as well as a second embodiment of the present invention will be described with referring to the accompanying drawings. The first embodiment is related to an example of the present invention which is applied to a ratchet type clutch apparatus which can change over torque transmitting directions. The second embodiment is an example of the present invention applied to a sprag type clutch apparatus.

Before the description, some terms relating to directions about the clutch apparatus according to the respective embodiments will be defined. In the description of the embodiments, the term "center axis" refers to the center axis of the clutch apparatus, that is, the center axis of an outer ring and an inner ring, and the terms "axial direction", "radial direction", and "circumferential direction" respectively refer to the axial direction, radial direction and circumferential direction with respect to that center axis.

Figure 1:
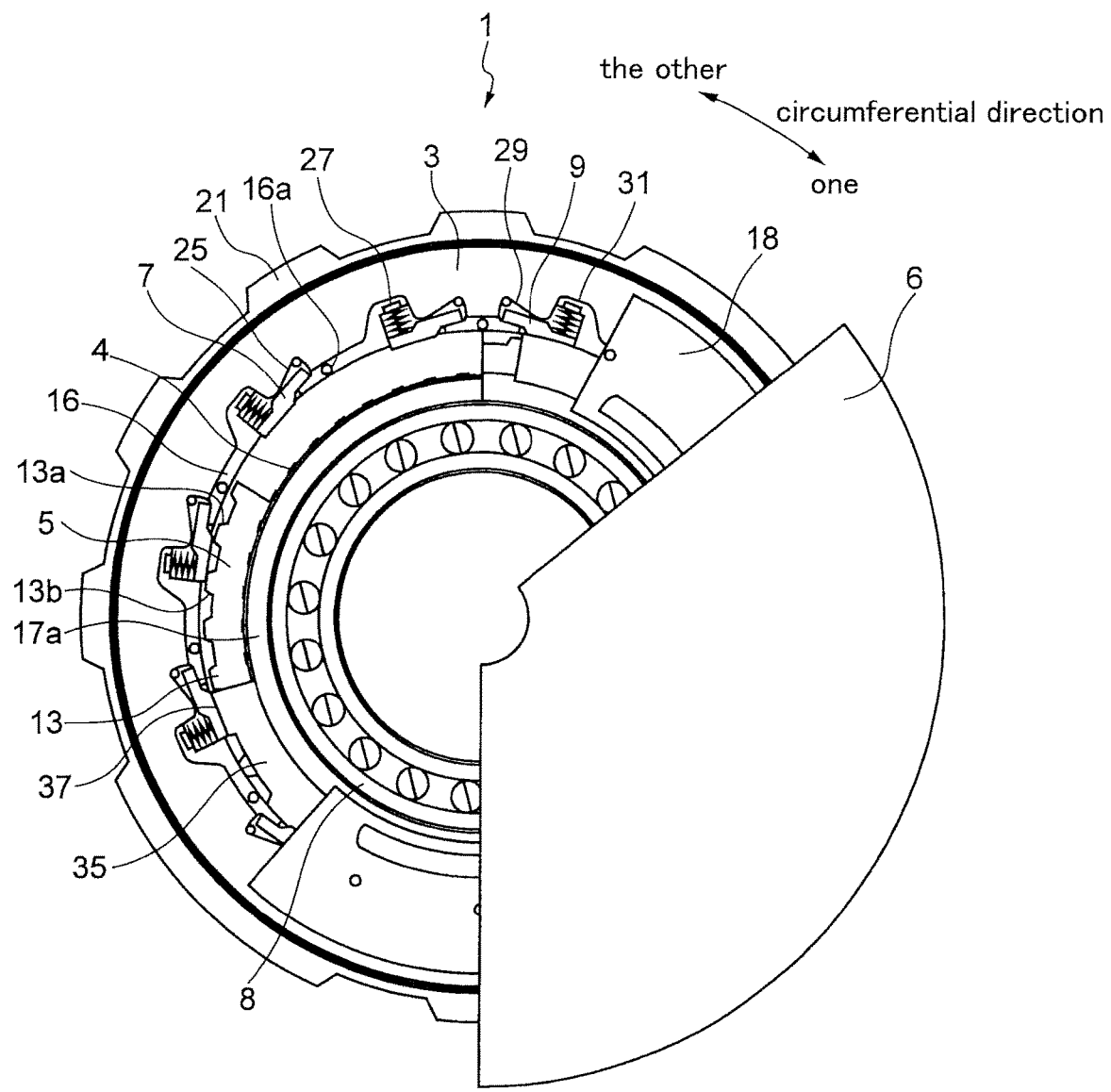
FIG. 1 is a front view of a torque transmitting direction change-over type clutch apparatus according to a first embodiment.
Figure 2:
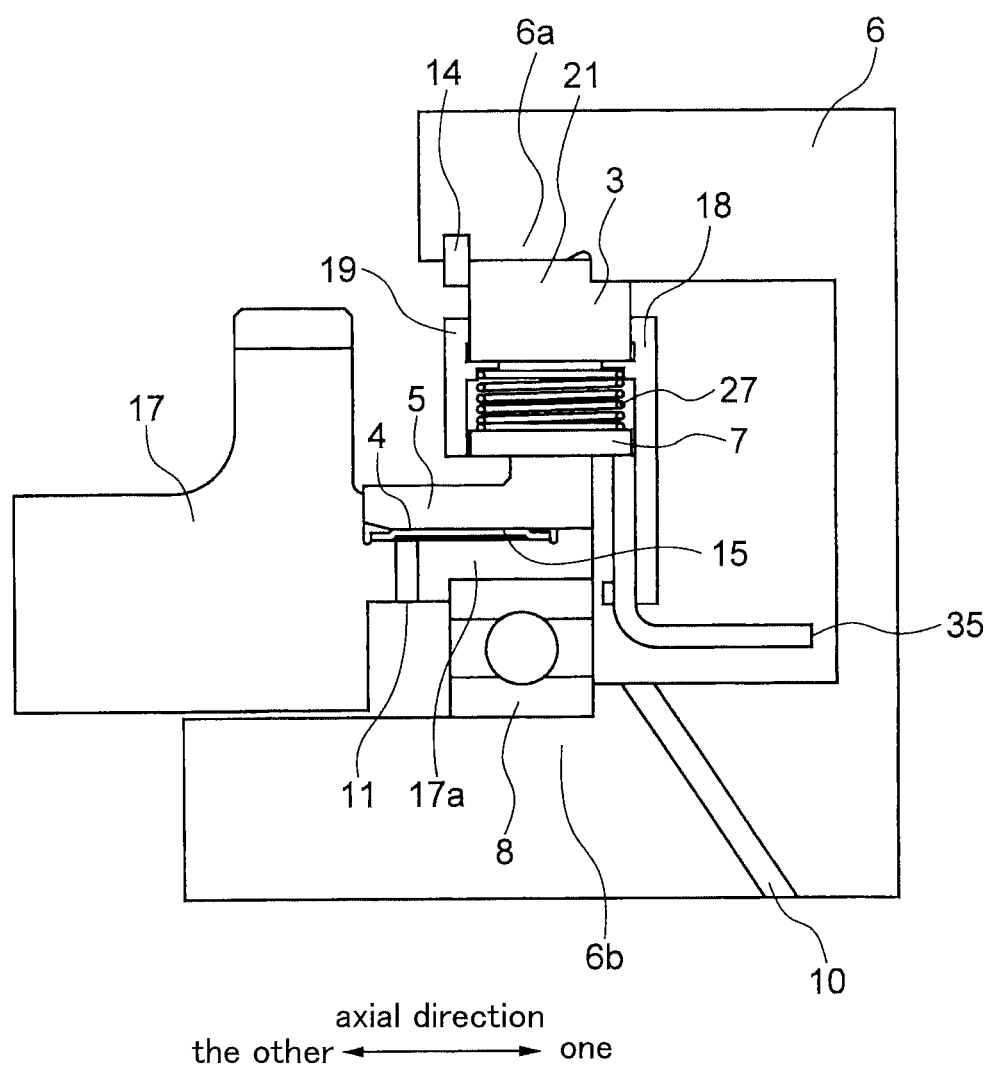
FIG. 2 is a cross sectional view taken along the center axis line of the torque transmitting direction change-over type clutch apparatus according to the first embodiment.
Figure 5:
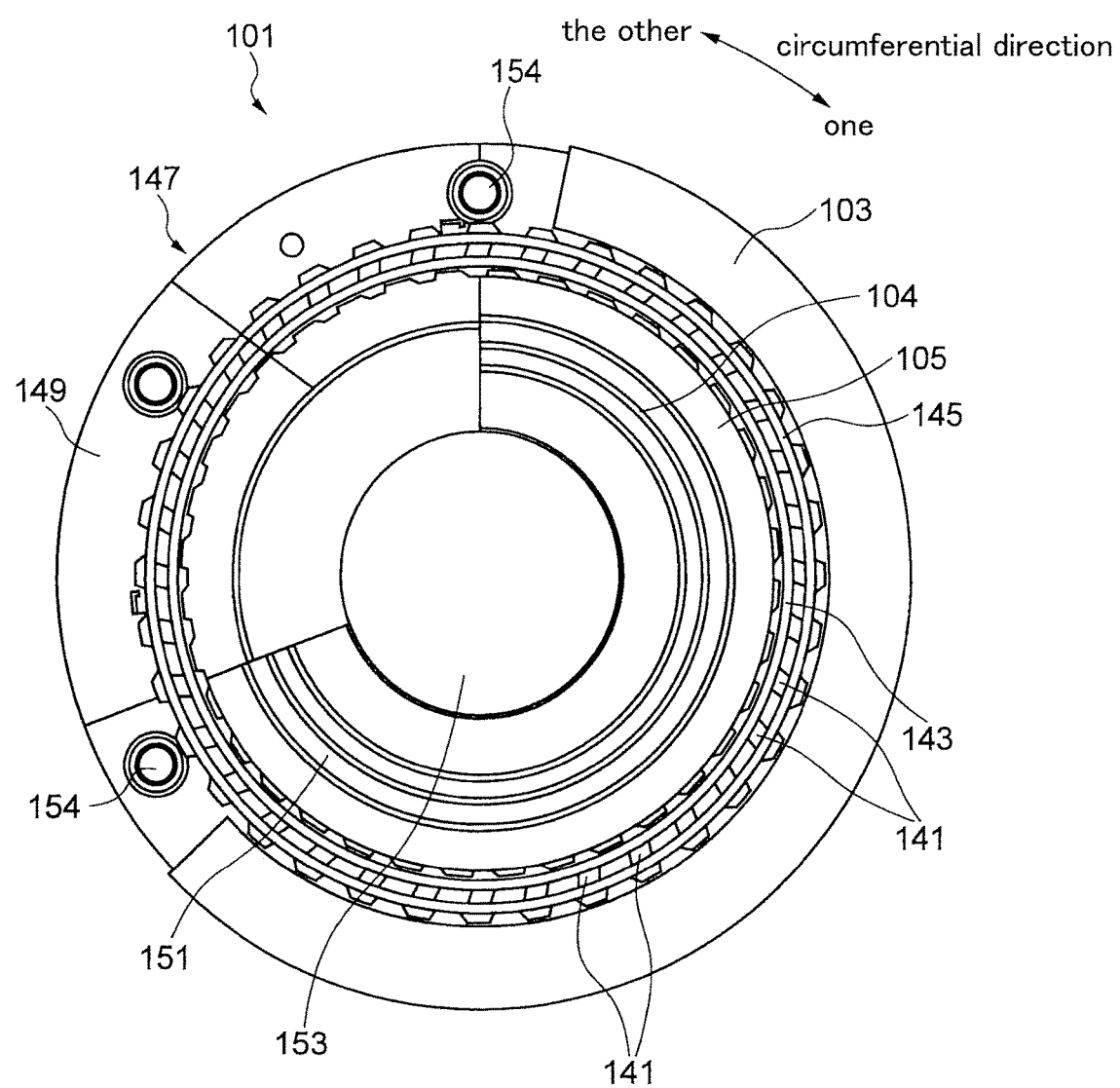
FIG. 5 is a front view of a sprag type clutch apparatus according to a second embodiment.
Figure 6:
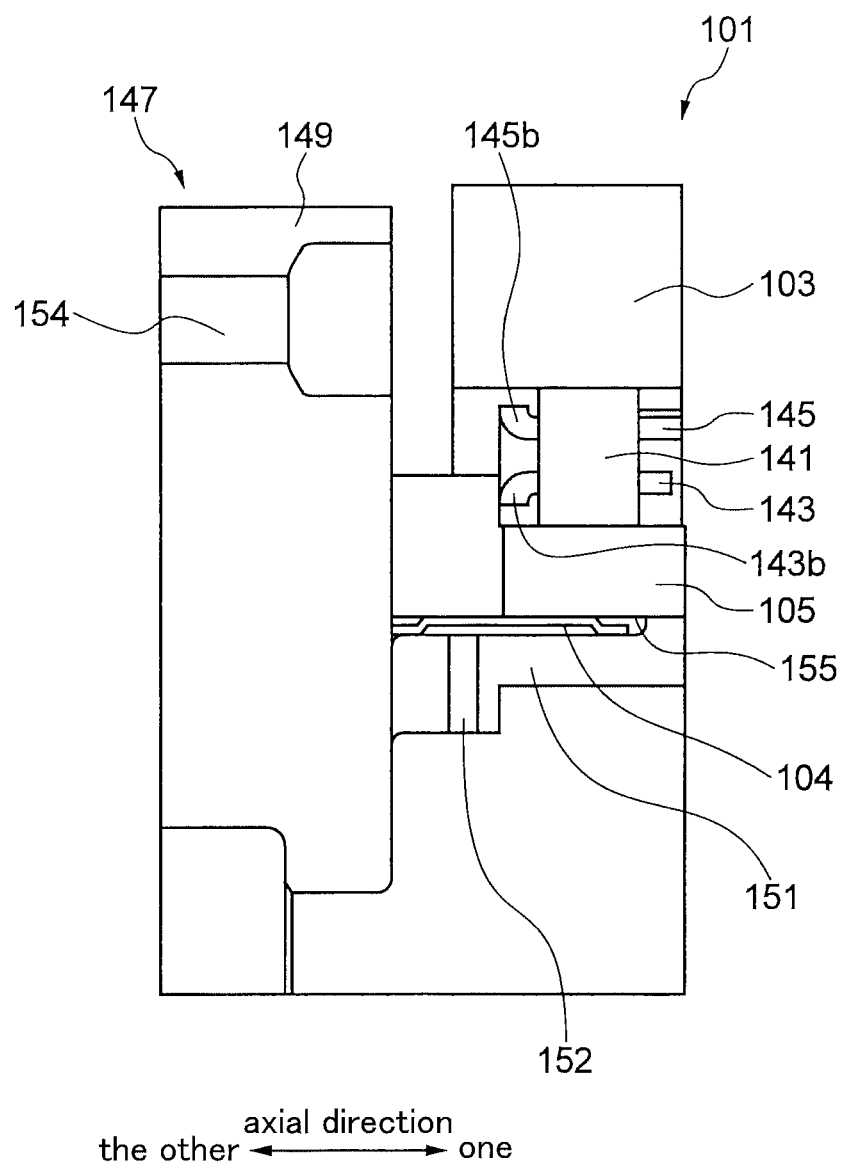
FIG. 6 is a cross sectional view taken along the center axis of the sprag type clutch apparatus according to the second embodiment.

In FIGS. 1 and 5, the front side of the plane of the drawing sheets is the first axial side, and the back side of the plane of the drawing sheets is the second axial side. As to the circumferential directions, the right-hand turning direction in FIGS. 1 and 5 will be referred to as the first circumferential direction or the clockwise direction, and the left-hand turning direction in FIGS. 1 and 5 will be referred to as the second circumferential direction or the counterclockwise direction. In FIGS. 2 and 6, the right side on the drawing sheets will be referred to as one side in the axial direction, and the left side on the drawing sheets will be referred to as the other side in the axial direction.

In each of the embodiments, an example of a clutch apparatus is explained, in which an inner ring is at a rotation side and an outer ring is at a stationary or fixed side, and the inner ring is a driving ring that can transmit torque therefrom to the outer ring. However, rotation of the outer ring and rotation of the inner ring are relative to each other. For example, in a case where the inner ring rotates in the clockwise direction, the outer ring is rotatable in the counterclockwise direction, and even in a case where the inner ring and the outer ring rotate in the same direction, if rotation speeds are different from each other, it can be said that the outer ring and the inner ring rotate relatively in either direction.

First Embodiment

Next, an excessive torque releasing type clutch apparatus according to the first embodiment of the present invention, will be explained. The excessive torque releasing type clutch apparatus according to the first embodiment is a ratchet type clutch apparatus that is of torque transmitting direction change-over type. Meanwhile, the ratchet type clutch apparatus that is capable of changing over torque transmitting directions is simply referred to, hereinafter, as ratchet type changeover clutch apparatus.

FIG. 1 is a front view seen in the center axial direction of the ratchet type changeover clutch apparatus 1 according to the first embodiment, where a part of the ratchet type changeover clutch apparatus 1 is omitted for showing an inside structure thereof in detail.

FIG. 2 is a cross sectional view taken along the center axis direction of the ratchet type changeover clutch apparatus 1 according to the first embodiment.

Figure 3:
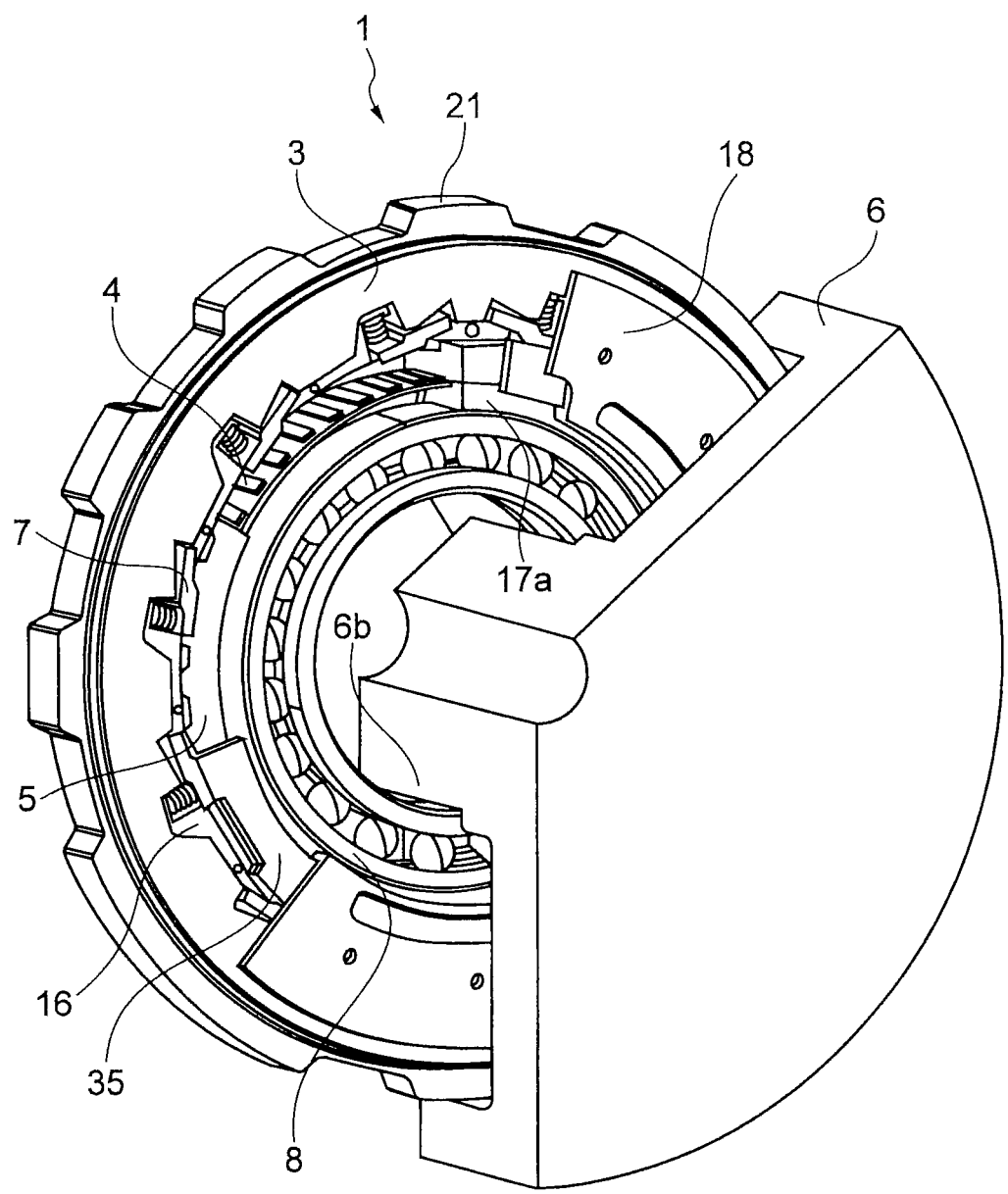
FIG. 3 is a perspective view of the torque transmitting direction change-over type clutch apparatus according to the first embodiment.

FIG. 3 is a perspective view of the ratchet type changeover clutch apparatus 1 according to the first embodiment. In FIG. 3 also, the ratchet type changeover clutch apparatus is partially omitted in order to show the internal structure.

The ratchet type changeover clutch apparatus 1 according to the present embodiment comprises an annular outer ring 3, an annular inner ring 5 which is arranged radially inside the outer ring 3 and in coaxial with the center axis of and rotatable relative to the outer ring 3, and a torque transmitting mechanism that is capable of transmitting torque between the outer ring 3 and the inner ring 5. The torque transmitting mechanism in the present embodiment is a ratchet type mechanism which includes a plurality of first pawl members 7 and a plurality of second pawl members 9 provided in the inner peripheral portions of the outer ring 3. Meanwhile, regarding the pawl members 9, only one is shown in FIG. 1.

The outer peripheral portion of the inner ring 5 is formed with a plurality of tooth portions 13 equidistantly in the circumferential direction over the entire circumference. The tooth portion 13 projects radially outwardly and extends in the center axial direction. The tooth portions 13 constitute ratchet teeth to be engaged with the first pawl members 7 and the second pawl members 9. More concretely, one side, in the circumferential direction, of the tooth portion 13 constitutes a first engageable portion 13a to be engaged with the first pawl 7, and the other side, in the circumferential direction, of the tooth portion 13 constitutes a second engageable portion 13b to be engaged with the second pawl 9.

As shown in FIG. 2, the inner ring 5 is formed at the inner peripheral side thereof with a circular hole 15 about the center axis and extended in the center axial direction. Accordingly, the inner peripheral wall of the hole 15 forms a cylindrical inner peripheral surface of the inner ring 5. Inside the hole 15 in the radial direction, the cylindrical portion 17a of a hub bearing 17 is inserted in coaxial with the inner ring 5. The cylindrical portion 17a is formed with a lubricating oil passage hole 11 penetrated in the radial direction. In the hole 15 and between the outer peripheral surface of the cylindrical portion 17a and the inner peripheral surface of the inner ring 5, a tolerance ring 4 is disposed. The structure and the operation of the tolerance 6a ring 4 will be described in detail herein later.

The outer ring 3 at the outer peripheral surface is formed with a plurality of radially outward projected portions 21 equidistantly in the circumferential direction and extended in the center axial direction. The projected portions 21 are fitted in the fitted portions 6a of a casing 6. The outer ring 3 is restricted by a snap ring 14 from moving in the center axial direction. Thus, the outer ring 3 is fixed to the casing 6.

The casing 6 is formed with a bearing supporting portion 6b in a position opposed to the fitting portion 6a in the radial direction. A ball bearing 8 is fitted on the bearing supporting portion 6b. The ball bearing 8 is fitted in the cylindrical portion 17a of the hub bearing 17 and rotatably supports the hub bearing 17. A lubricating oil passage hole 10 is formed through a portion of the casing 6 adjacent to the bearing supporting portion 6b.

As shown in FIG. 1, the first pawl member 7 is held in a concave portion 25 provided in the inner peripheral portion of the outer ring 25. The concave portions 25 open radially inwardly in the inner periphery of the outer ring 5. The first pawl member 7 has a predetermined circumferential length. The first pawl member 7 is so disposed that a portion, at one side in the circumferential direction, of the first pawl member 7 is received in the concave portion 25. A portion, at the other side in the circumferential direction, of the first pawl member 7 is urged radially inwardly by a coil spring 27. In FIG. 1, a clockwise rotation of the inner ring 5 brings the first pawl member 7 into engagement with the first engaging portion 13a of the tooth portion 13 of the outer ring 5. On the other hand, a counterclockwise rotation of the inner ring 5 causes the first pawl member 7 to be pushed radially outwardly by the tooth portion 13 of the inner ring 5 against the force of the spring 27, thereby allowing the rotation of the inner ring 5. Thus, the first pawl member 7 locks one directional rotation of the inner ring 5 and allows the other directional rotation of the inner ring 5.

The second pawl members 9 are held in the concave portions 29 provided in the inner peripheral portion of the outer ring 3 in the same manner as the first pawl member 7, and urged by the springs 31, but orientation of the second pawl member 9 is reverse to that of the first pawl member 7. Accordingly, the second pawl members 9 allow the one directional rotation of the inner ring 5 and lock the other directional rotation of the inner ring 5.

A retaining member 16 is disposed in the radial direction between the outer ring 3 and the inner ring 5. The retainer member 16 holds the first pawl members 7, the springs 27, the second pawl members 9 and the springs 31 in their respective predetermined positions. The retaining member 16 has axially extended both ends 16a which are inserted in the hole of a first annular holding plate 18 disposed at one side in the center axial direction and in the hole of a second annular holding plate 19 disposed at the other side in the center axial direction. With such a configuration, a movement of the retaining member 16 in the circumferential direction is prevented.

As described above, the first pawl members 7 and the second pawl members 9 held respectively in the concave portions 25 and 29 of the outer ring 3, the springs 27 and 31 and the inner ring formed with the tooth portions 13 constitute a ratchet mechanism.

In the ratchet type changeover clutch apparatus 1 according to the present embodiment, an annular plate 35 is disposed on the same axis as the inner ring 5 and adjacent thereto at the one side in the center axial direction of the inner ring 5. The plate 35 is a member for changing over the locking direction of the rotation of the inner ring 5 relative to the outer ring 3. In other words, the change-over plate 35 is a member for changing over torque transmitting direction from the inner ring 5 to the outer ring 3. The change-over plate 35 is provided rotatably about the center axis of the clutch apparatus 1.

The outer peripheral surface of the annular change-over plate 35 is provided with a plurality of projected portions 37 which are projected outwardly in the radial direction and which have predetermined circumferential lengths. The outer peripheral surface of each projected portion 37 opposes in the radial direction to the inner periphery of the outer ring 3. The outer peripheral surface of each projected portion 37 opposes in the radial direction to the inner peripheral surface of the first or second pawl member 7 or 9.

When the change-over plate 35 is rotated so that the projected portion 37 is positioned to oppose to the corresponding first or second pawl member 7 or 9, and is brought into contact with the inner peripheral surface of the first or second pawl member 7 or 9, the inner peripheral surface of the first pawl member 7 or second pawl member 9 is pushed radially more outwardly than the tooth portion 13 of the inner ring 5 and held there. Accordingly, the projected portions 37 prevent the first pawl members 7 or the second pawl members 9 from being brought into engagement with the tooth portions 13 of the inner ring 5.

The change-over plate 35 is rotatable to change the position in the circumferential direction of the projected portion 37 with respect to the first pawl member 7 or the second pawl member 9. Thus, states of combination of contact or non-contact of the first pawl member 7 or the second pawl member 9 with the projected portion 37 are changed, thereby combinations of combined state and non-combined state of the first pawl member 7 or the second pawl member 9 with the tooth portion 13 of the inner ring 5, being changed. The ratchet type clutch apparatus 1 according to the present embodiment can take four states as described herein after, by changing combined states and non-combined states of the first pawl members 7 or the second pawl members 9 with the tooth portions 13 of the inner ring 5.

The first state of the ratchet type change-over clutch apparatus 1 according to the present embodiment is a state where the first pawl member 7 and the second pawl member 9 are in engagement with the tooth portions 13 of the inner ring 5 by the spring forces of the springs 27 and 31, respectively. In this state, rotation of the inner ring 5 relative to the outer ring 3 is locked in both directions of one circumferential direction and the other circumferential direction.

The second state of the ratchet type change-over clutch apparatus 1 according to the present embodiment is a state where the first pawl member 7 is in disengagement from the tooth portion 13 of the inner ring 5, and the second pawl member 9 is in engagement with the tooth portion 13 of the inner ring 5 by the spring force of the spring 31. In this second state, the inner ring 5 is rotatable with respect to the outer ring 3 in one circumferential direction but locked from rotating in the other circumferential direction.

The third state of the ratchet type clutch change-over apparatus 1 according to the present embodiment is a state where the first pawl member 7 is in engagement with the tooth portion 13 of the inner ring 5 by the spring force of the spring 27, and the second pawl member 9 is in disengagement from the tooth portion 13 of the inner ring 5. In this third state, the inner ring 5 is rotatable with respect to the outer ring 3 in the other circumferential direction but locked from rotating in the one circumferential direction.

The fourth state of the ratchet type change-over clutch apparatus 1 according to the present embodiment is a state where both of the first pawl member 7 and the second pawl member 9 are in disengagement from the tooth portion 13 of the inner ring 5. In this fourth state, the inner ring 5 is not locked, with respect to the outer ring 3, in both directions of one circumferential direction and the other circumferential direction, but is rotatable in either direction of one circumferential direction and the other circumferential direction.

Rotary movement of the change-over plate 35 is effected by, for example, an unillustrated actuator, by which the change-over plate 35 is rotated about the center axis so that the ratchet type change-over clutch apparatus 1 takes any one of the above described four states.

Next, a configuration and an operation of the tolerance ring 4 will be explained.

Figure 4:
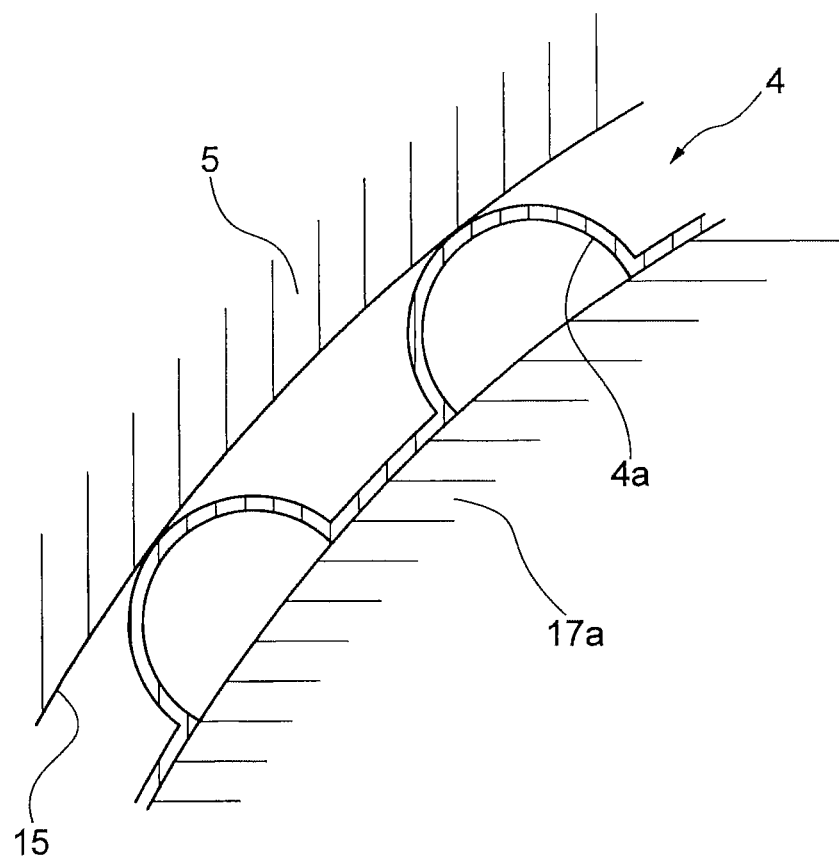
FIG. 4 is an enlarged view showing a tolerance ring of the torque transmitting direction change-over type clutch apparatus according to the first embodiment.

FIG. 4 is an enlarged cross sectional view taken along the center axis of the tolerance ring 4 of the ratchet type change-over clutch apparatus 1 according to the present embodiment.

The tolerance ring 4 is made of spring steel and an annular elastic member formed with a plurality of projections 4a projected radially outwardly. The plurality of projections 4a are equidistantly apart from each other in the circumferential direction. The projections 4a of the tolerance ring 4 are formed by pressing a flat plate. The projection 4a may have any shape, but in the present embodiment it is arc-shaped in cross section taken along the perpendicular plane to the center axial direction.

The tolerance ring 4 is disposed between the inner ring 5 and the cylindrical portion 17a of the hub bearing 17 and in contact with the inner peripheral surface of the inner ring 5 and the outer peripheral surface of the cylindrical portion 17a with a predetermined pressure in the radial direction. With this configuration, the tolerance ring 4 generates a predetermined friction force at the inner peripheral surface of the inner ring 5 and the outer peripheral surface of the cylindrical portion 17a against the relative rotation of the inner ring 5 to the hub bearing 17. In other words, the tolerance ring 4 connects the inner ring 5 and the hub bearing 17 by the friction force. Thus, when torque is input from the hub bearing 17 to the inner ring 5, the inner ring 5 and the hub bearing 17 rotate together as one body until a determined torque.

On the other hand, in a case where a torque that exceeds the determined torque, that is, an excessive torque is input to the hub bearing 17, the torque between the inner ring 5 and the cylindrical portion 17a of the hub bearing 17 exceeds the friction torque caused by the friction force of the tolerance ring 4, a slip is generated between the tolerance ring 4 and the inner ring 5 or between the tolerance ring 4 and the cylindrical portion 17a, thereby the inner ring 5 and the hub bearing 17 rotating relatively to each other. In other words, the connection between the inner ring 5 and the hub bearing 17 caused by the friction force of the tolerance ring 4 is released. Thus, no torque is transmitted from the hub bearing 17 to the inner ring 5, and an excessive torque is prevented from being input to the ratchet type change-over clutch apparatus 1.

As described above, in a normal mode of the ratchet type changeover clutch apparatus 1, that is, in a state where a torque which is below the determined torque, can be transmitted between the cylindrical portion 17a of the hub bearing 17 and the inner ring 5, the tolerance ring 4 connects the cylindrical portion 17a of the hub bearing 17 and the inner ring 5 to be able to transmit torque therebetween. That is to say, the tolerance ring 4 allows a torque to be input from the hub bearing 17 to the ratchet type changeover clutch apparatus 1. On the other hand, in an abnormal mode of the ratchet type changeover clutch apparatus 1, that is, in a state where a torque which exceeds the determined torque, is generated at the hub bearing 17, the tolerance ring 4 restricts transmission of the torque between the cylindrical portion 17a of the hub bearing 17 and the inner ring 5. That is to say, the tolerance ring 4 restricts the torque to be input from the hub bearing 17 to the ratchet type changeover clutch apparatus 1.

Next, a case where an inverse input torque is input to the ratchet type changeover clutch apparatus 1 according to the present embodiment, will be explained. In this case, an impact torque that exceeds the determined value is input from the outer ring 3 that is the driven ring to the ratchet type changeover clutch apparatus 1.

An operation state in the normal mode of the ratchet type changeover clutch apparatus 1, corresponds to the above described third state of the ratchet type changeover clutch apparatus 1. In this state, the cylindrical portion 17a of the hub bearing 17 rotates in the clockwise direction in FIG. 1, the hub bearing 17 and the inner ring 5 that is the driving ring rotate together as one body in the clockwise direction through the tolerance ring 4, and further the inner ring 5 and the outer ring 3 rotate together as one body through the first pawl members 7. In this state, a torque is transmitted from the inner ring 5 to the outer ring 3.

In such a normal mode operation state, if an impact toque that exceeds the determined torque in the direction by which the outer ring 3 rotates in the counterclockwise direction, is applied to the outer ring 3, this torque is transmitted to the inner ring 5 through the first pawl member 7. Thus, the impact torque is applied to the inner ring 5 to rotate the same in the counterclockwise direction. At this time, the torque between the inner ring 5 and the cylindrical portion 17a of the hub bearing 17 exceeds the friction torque caused by the friction force generated by the tolerance ring 4, a slip is generated between the tolerance ring 4 and the inner ring 5 or between the tolerance ring 4 and the cylindrical portion 17a, thereby the inner ring 5 and the hub bearing 17 rotating relatively. Thus, the inverse input torque is released, so no torque is transmitted from the inner ring 5 to the hub bearing 17.

As described, in the ratchet type changeover clutch apparatus 1 according to the present embodiment, even if inversely directed torque that exceeds the determined torque is input to it, that inverse input torque is immediately released by the tolerance ring 4, so no inverse input torque is continuously applied to constituent members, such as, the outer ring 3, the inner ring 5, the first pawl member 7 and the second pawl member 9. Therefore, according to the present embodiment, it is not necessary to make the thickness of the outer ring 3 and the inner ring 5 larger in order to secure the strength against such inverse input torque. This is the same with respect to the first and second pawl members 7 and 9, and it is not necessary to make them larger in size.

As described above, the tolerance ring 4 constitutes an input torque restricting mechanism which allows input torque that is below the determined torque to be transmitted from the hub bearing 17 to the inner ring 5 and restricts input torque that exceeds the determined value from being transmitted. Further, the tolerance ring 4 restricts inverse torque that exceeds the determined value from the outer ring 3 from being transmitted to the hub bearing 17. Meanwhile, a magnitude of the input torque transmitted from the hub bearing 17 to the inner ring 5 as well as a magnitude of an inverse torque from the outer ring 3 to be released by the tolerance ring 4, can be determined properly in accordance with a torque capacity of the ratchet type changeover clutch apparatus 1.

According to the ratchet type changeover clutch apparatus 1 according to the first embodiment, it is possible to release an excessive torque not to be input thereto, so that it is possible to simplify or eliminate, in manufacturing stage of constituent parts of the clutch apparatus, treatment for securing the strength of those parts.

Second Embodiment

Next, an excessive torque releasing type clutch apparatus according to a second embodiment of the present invention, will be described. The excessive torque releasing type clutch apparatus according to the second embodiment is a sprag type clutch apparatus.

FIG. 5 is a front view of the sprag type clutch apparatus 101 according to the second embodiment. In FIG. 5, the sprag type clutch apparatus 101 is shown with a portion thereof being omitted to show an internal structure.

FIG. 6 is a cross sectional view taken along the center axis direction of the sprag type clutch apparatus 101 according to the second embodiment.

Figure 7:
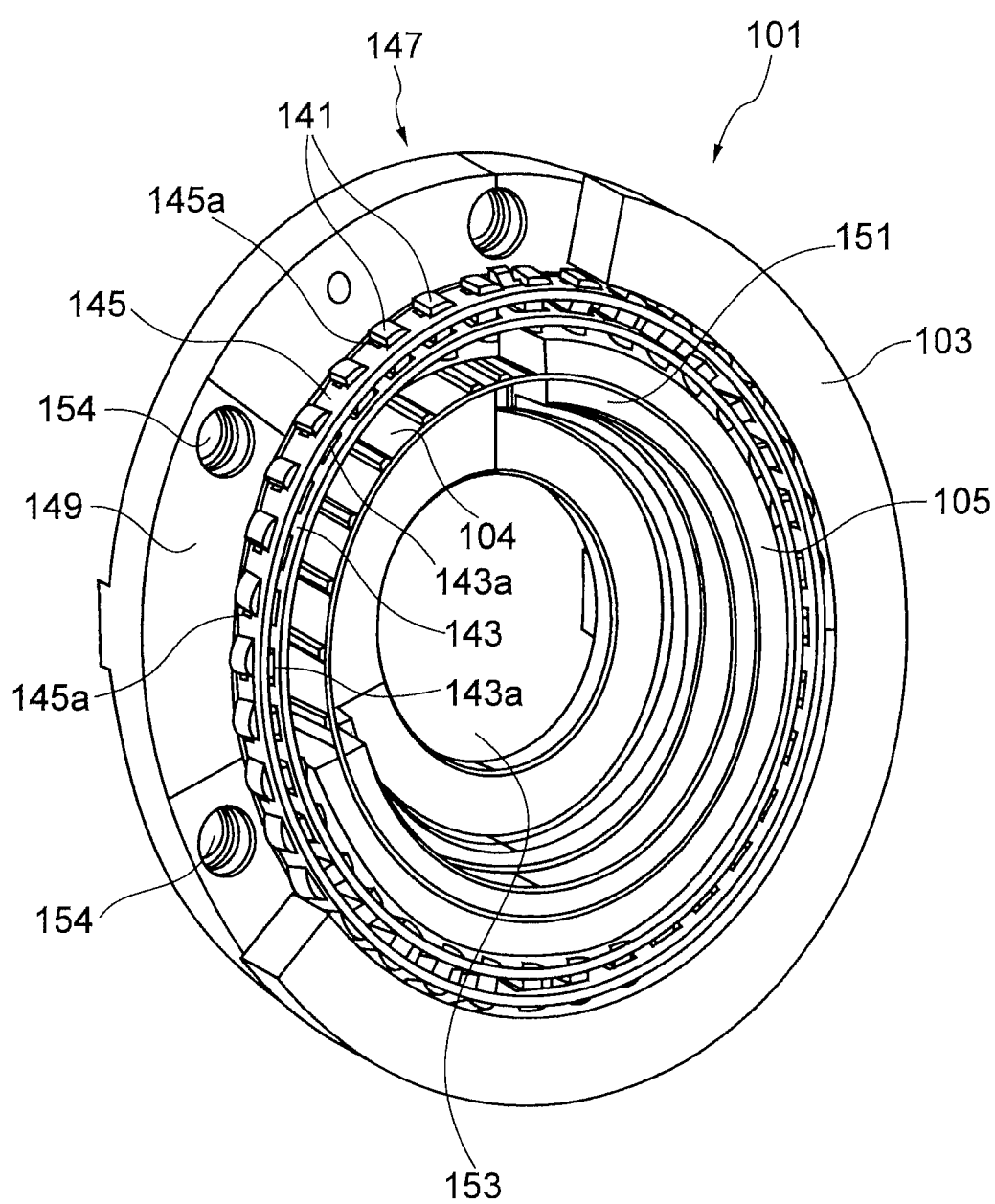
FIG. 7 is a perspective view of the sprag type clutch apparatus according to the second embodiment.

FIG. 7 is a perspective view of the sprag type clutch apparatus 101 according to the second embodiment. In FIG. 7 also, a part of the sprag type clutch apparatus is omitted in order to show the internal structure.

The sprag type clutch apparatus 101 according to the present embodiment comprises an annular outer ring 103, an annular inner ring 105 arranged in coaxial with and radially inside the outer ring 103 and rotatably relative to the outer ring 103, sprags 141 as torque transmitting members disposed between the outer ring 103 and the inner ring 105, and a pair of inner diameter side retainer 143 and outer diameter side retainer 145 made of iron and retaining the sprags between the outer ring 103 and the inner ring 105.

The sprag type clutch apparatus is held on an annular hub 147. The hub 147 is formed integrally with an annular portion 149 and a cylindrical portion 151 that projects from one side of the annular portion 149 along the center axis toward the one side, and the hub 147 is formed at the central portion with a hole 153 through which a shaft member not illustrated is inserted. The hub 147 is fixed to other rotating member (not illustrated) of an unillustrated transmission mechanism through unillustrated bolts inserted into holes 154 formed through the annular portion 149.

As shown in FIG. 6, the inner ring 105 of the sprag type clutch apparatus 101 is held on the annular portion 149 of the hub 147. Concretely, the inner ring 105 is supported on a surface at the one side in the axial direction of the annular portion 149. As shown in FIG. 6, an inner peripheral surface of the inner ring 105 forms a circular hole 155 extended along the center axis as the center thereof. Inside the hole 155 in the radial direction, the cylindrical portion 151 of the hub 147 is inserted coaxially in the inner ring 105. The cylindrical portion 151 is formed in the radial direction therethrough with a lubricating oil passage hole 152. A tolerance ring 104 is disposed in the hole 155 over the circumferential direction between the outer peripheral surface of the cylindrical portion 151 and the inner peripheral surface of the inner ring 105. The configuration of the tolerance ring 104 is the same as that in the first embodiment.

The sprag 141, as shown in FIG. 5, is gourd-shaped which is narrowed or constricted in the central portion and whose lengthwise direction is substantially a radial direction. A plurality of sprags 141 are arranged equi-distantly in the circumferential direction with being inclined by predetermined angle with respect to the radial direction of the outer ring 103 and the inner ring 105. When the sprags 141 are brought into engagement with the outer peripheral surface of the inner ring 105 and the inner peripheral surface of the outer ring 103, a torque is transmitted between the inner ring 105 and the outer ring 103. Incidentally, a moment for raising the sprags is applied by unillustrated spring member, so that the sprags are biased into the direction to be brought into engagement with the inner ring 105 and the outer ring 103 in the same manner as the conventional sprag type clutch apparatus.

The inner diameter side retainer 143 retains a radially inner portion of the sprag 141. The inner diameter side retainer 143 is cylindrical and formed radially therethrough with a plurality of openings 143a distant from each other in the circumferential direction. The sprag 141 is so disposed to be radially passed through the opening 143a of the inner diameter side retainer 143. An end, at the other side in the axial direction, of the inner retainer 143 is formed with an annular radially inward flange 143b. The radially inner edge of the radially inward flange 143b engages the outer peripheral surface of the inner ring 105, thereby the inner retainer 143 being positioned and centered. The inner diameter side retainer 143 restricts movement of the radially inner portion of the sprag 141 and restrains excessive inclination of the sprag 141.

The outer diameter side retainer 145 retains a radially outer portion of the sprag 141. The outer diameter side retainer 145 is cylindrical and has a larger diameter than that of the inner diameter side retainer 143. The outer diameter side retainer 145 is formed radially therethrough with a plurality of openings 145a distant from each other in the circumferential direction. The sprag 141 is so disposed to be radially passed through the opening 145a of the outer diameter side retainer 145. An end, at the other side in the axial direction, of the outer diameter side retainer 145 is formed with an annular radially outward flange 145b. The radially outer edge of the radially outward flange 145b engages the inner peripheral surface of the outer ring 103, thereby the inner retainer 143 being positioned and centered. The outer diameter side retainer 145 restricts movement of the radially outer portion of the sprag 141 and restrains excessive inclination of the sprag 141.

In the sprag type clutch apparatus 101 as configured above, if the inner ring 105 rotates in one circumferential direction in FIG. 5, that is, in clockwise direction, the sprag 141 follows this rotation and so rotates that the longitudinal direction thereof approaches the diametral direction of the inner ring 105 and the outer ring 103. This means that the sprag 141 is raised and brought into engagement with the outer peripheral surface of the inner ring 105 and the inner peripheral surface of the outer ring 103, so the inner ring 105 and the outer ring 103 rotate together integrally. Thus, a torque input from the inner ring 105 is transmitted to the outer ring 105 through the sprag 141, and is output from the outer ring 105.

On the other hand, in the sprag type clutch apparatus 101, if the inner ring 105 rotates in the other circumferential direction in FIG. 5, that is, in counterclockwise direction, the sprag 141 is not raised. This means that the sprag 141 is not brought into engagement with the outer peripheral surface of the inner ring 105 and the inner peripheral surface of the outer ring 103. In this state, the inner ring 105 rotates idly relative to the outer ring 105. Thus, no torque is transmitted from the inner ring 105 to the outer ring 105.

Next, the operation of the tolerance ring 104 according to the present embodiment will be explained.

The tolerance ring 104 connects the inner ring 105 and the cylindrical portion 151 of the hub 147 by the friction force, in the same manner as the first embodiment. In other words, the tolerance ring 104 connects the inner ring 105 and the hub 147. Accordingly, in a case where a torque is input to the inner ring 105 from the hub 147, the inner ring 105 and the hub 107 rotate together integrally until or below the determined torque.

On the other hand, however, in a case where a torque that exceeds the determined torque (that is, an excessive torque) is input to the hub 147, a slip occurs between the tolerance ring 104 and the cylindrical portion 151, and the inner ring 105 and the hub 147 makes a relative rotation. In other words, a connection between the tolerance ring 104 and the hub 147 caused by the friction by the tolerance ring 104 is released. Thus, no torque is transmitted from the hub 147 to the inner ring 105, and it becomes possible to prevent excessive torque from being input to the sprag type clutch apparatus 101.

Next, explanation will be made to a case where inverse input torque enters the sprag type clutch apparatus 101 according to the present embodiment, that is, a case where impact torque that exceeds the determined value is input from the outer ring 103 that is a driven ring.

The operation state in the normal mode of the sprag type clutch apparatus 101, is a state where the hub 147 shown in FIG. 5 rotates in the clockwise direction, and the hub 147 and the inner ring 105 that is a driving ring rotate integrally through the tolerance ring 104, and further the inner ring 105 and the outer ring 103 rotate integrally through the sprag 141. In this state, a torque is transmitted from the inner ring 105 to the outer ring 103.

In the operation state in the normal mode as described above, if an impact torque exceeding the determined torque in the counterclockwise direction is applied to the outer ring 103, the impact torque is transmitted to the inner ring 105 through the sprag 141. That is to say, the impact torque is applied to the inner ring 105 to rotate the same in the counterclockwise direction. Then, torque between the inner ring 105 and the cylindrical portion 151 of the hub 147 exceeds friction torque caused by friction of the tolerance ring 104 with the inner ring 105 and the cylindrical portion 151, and a slip is generated between the tolerance ring 104 and the cylindrical portion 151, so that the inner ring 105 and the hub 147 makes a relative rotation. Thus, the inverse input torque is immediately released by the tolerance ring 104, and no torque is transmitted from the inner ring 104 to the hub 147. Therefore, the excessive torque input to the sprag type clutch apparatus can be prevented.

As described, in the state where a torque below the determined torque is transmitted between the cylindrical portion 151 of the hub 147 and the inner ring 105, the tolerance ring 104 of the sprag type clutch apparatus 101 according to the present embodiment connects the cylindrical portion 151 and the inner ring 105 to be able to transmit torque therebetween, while in the state where a torque exceeding the determined value is applied to the hub 147, the tolerance ring 104 restricts transmission of the torque between the cylindrical portion 151 of the hub 147 and the inner ring 105.

Further, in the sprag type clutch apparatus 101 according to the present embodiment, the inverse input torque, even if input thereto, is released immediately by the tolerance ring 104, and therefore the inverse input torque can be prevented from being applied to constituent members such as, outer ring 103, inner ring 105 and sprags 141 of the sprag type clutch apparatus 101. Accordingly, according to the present embodiment, it is possible to restrain the outer ring 103 as well as the inner ring 105 from enlarging in thickness in order to secure the strength against the inverse input torque. Similarly, size of the clutch apparatus itself can be made proper, this contributing to make the apparatus compact or small in size to be adopted in automatic transmission, for example. Furthermore, special treatment in manufacturing step in order to satisfy strength requirement of those members, may be simplified or omitted.

According to the sprag type clutch apparatus 101 according to the present embodiment as explained above, excessive torque can be released from being input thereto, and special treatment step for securing strength of constituent parts in manufacturing process may be simplified or omitted as the case may be, in the same manner as the first embodiment.

Incidentally, the excessive torque releasing type clutch apparatus according to the present invention is not limited to the above explained embodiments but may be modified. For example, the ratchet type change-over clutch apparatus 1 according to the first embodiment can be so modified that the inner peripheral portion of the outer ring 3 is provided with a tooth portion and that the outer peripheral portion of the inner ring 5 is provided with first and second pawls. Further, the present invention may be applied to a ratchet type one way clutch apparatus having no mechanism for switching over torque transmitting direction.

Further, the ratchet type change-over clutch apparatus 1 according to the first embodiment or the sprag type clutch apparatus according to the second embodiment, can be so modified that the outer ring 3 is used as a driving ring and that torque is transmitted from the outer ring 3 to the inner ring 5. In this case, the tolerance ring 4(104) is disposed between the outer peripheral surface of the outer ring 3(103) and the inner peripheral surface of an input torque transferring member disposed at the radially outer side of the outer ring 3(103) in coaxial with the outer ring 3(103).

Further, according to the second embodiment, sprag is used as torque transmitting member for the clutch apparatus, but other torque transmitting member such as cylindrical roller, or cam may be used without limited to sprag.

REFERENCE SIGNS LIST

1: ratchet type torque transmitting direction change-over clutch apparatus
3, 103: outer ring
4, 104: tolerance ring
4a: projection
5, 105: inner ring
6: casing
6a: fitting portion
6b: bearing supporting portion
7: first pawl member
8: ball bearing
9: second pawl member
10, 11: lubricating oil passage hole
13: tooth portion
13a: first engaging portion
13b: second engaging portion
14: snap ring
15: hole
17: hub bearing
17a: cylindrical portion
21: projected portion
25, 29: concave portion
35: change-over plate
37: projected portion
101: sprag type clutch apparatus
141: sprag
147: hub
149: annular portion
151: cylindrical portion

What is claimed is:

1. A clutch apparatus comprising:
an outer ring;
an inner ring arranged radially inside said outer ring and coaxially with a center axis of said outer ring and rotatably relative to said outer ring;
a torque transmitting portion having a plurality of torque transmitting members arranged for transmitting torque having the center axis as the center between said outer ring and said inner ring; and
a restricting mechanism for restricting input torque that exceeds a predetermined value from being input from an input torque transmitting member to a driving ring of said outer ring and said inner ring and inverse torque that is input to a driven ring of said outer ring and said inner ring and exceeds the predetermined value from being input to said input torque transmitting member;
wherein said input torque transmitting member is disposed radially inside said inner ring and coaxially with said inner ring and has an outer peripheral surface opposed radially to an inner peripheral surface of said inner ring;
said restricting mechanism comprises a tolerance ring disposed in contact with the inner peripheral surface of said inner ring and the outer peripheral surface of said input torque transmitting member;
said tolerance ring is integrally formed with a plurality of projections that are equidistantly apart from each other in a circumferential direction and projected radially outwardly; and
each of said plurality of projections is arc-shaped in cross section taken along a plane perpendicular to the center axis and disposed to be in pressure contact with the inner peripheral surface of said inner ring.

2. A clutch apparatus according to claim 1, wherein
said tolerance ring connects said inner ring and said input torque transmitting member by a friction force, said tolerance ring releasing connection of said inner ring with said input torque transmitting member when said input torque exceeds friction torque caused by said friction force and when said inverse torque exceeds the friction torque caused by said friction force.

3. A clutch apparatus according to claim 1, wherein
said torque transmitting portion comprises a ratchet mechanism.

4. A clutch apparatus according to claim 3, wherein
said ratchet mechanism comprises a plurality of tooth portions provided on one of the inner peripheral portion of said outer ring and the outer peripheral portion of said inner ring,
a plurality of first pawl members provided on the other of the inner peripheral portion of said outer ring and the outer peripheral portion of said inner ring and engaging said tooth portions and locking said inner ring from rotating in a first circumferential direction relative to said outer ring; and
a plurality of second pawl members provided on the other of the inner peripheral portion of said outer ring and the outer peripheral portion of said inner ring and engaging said tooth portions and locking said inner ring from rotating in a second circumferential direction relative to said outer ring.

5. A clutch apparatus according to claim 1, wherein
said torque transmitting portion comprises a plurality of sprags.

* * * * *